(12) United States Patent
Chuang et al.

(10) Patent No.: US 9,470,836 B2
(45) Date of Patent: Oct. 18, 2016

(54) DISPLAY DEVICE

(71) Applicant: AU OPTRONICS CORP., Hsin-Chu (TW)

(72) Inventors: Hsing-Jung Chuang, Hsin-Chu (TW); Super Liao, Hsin-Chu (TW); Chun-Ting Hsu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 106 days.

(21) Appl. No.: 14/613,757

(22) Filed: Feb. 4, 2015

(65) Prior Publication Data
US 2016/0018586 A1    Jan. 21, 2016

(30) Foreign Application Priority Data

Jul. 21, 2014    (TW) .............................. 103124931 A

(51) Int. Cl.
| | |
|---|---|
| *F21V 7/04* | (2006.01) |
| *G09F 13/04* | (2006.01) |
| *G09F 13/08* | (2006.01) |
| *A63F 9/24* | (2006.01) |
| *A63F 13/00* | (2014.01) |
| *G06F 17/00* | (2006.01) |
| *G06F 19/00* | (2011.01) |
| *F21V 8/00* | (2006.01) |
| *G07F 17/32* | (2006.01) |

(52) U.S. Cl.
CPC ........... *G02B 6/0053* (2013.01); *G02B 6/0061* (2013.01); *G07F 17/3213* (2013.01)

(58) Field of Classification Search
CPC .............. G02B 6/0053; G02B 6/0061; G07F 17/3213; G07F 17/3211; G02F 1/133606; G02F 1/133607; G02F 2001/133507
USPC ........................................................ 463/20
See application file for complete search history.

(56) References Cited

U.S. PATENT DOCUMENTS

| | | | |
|---|---|---|---|
| 7,219,893 B2 * | 5/2007 | Tanimura | .......... G02F 1/133615 273/143 R |
| 2005/0024555 A1 | 2/2005 | Shiraishi et al. | |
| 2006/0028597 A1 | 2/2006 | Kitagawa et al. | |
| 2008/0176653 A1 * | 7/2008 | Kishi | .................. G07F 17/3211 463/31 |

(Continued)

FOREIGN PATENT DOCUMENTS

| | | |
|---|---|---|
| JP | 2004192909 | 7/2004 |
| TW | M396444 | 1/2011 |

*Primary Examiner* — Y M Lee
*Assistant Examiner* — Erin Kryukova
(74) *Attorney, Agent, or Firm* — WPAT, PC; Justin King

(57) ABSTRACT

A display device includes a display panel, a backlight module and a reel. The backlight module faces the display panel and includes a light transmissive region, a light emitting region and a peripheral region, in which the peripheral region is disposed between the light transmissive region and the light emitting region. The light transmissive region includes a first edge extending along a first direction and a second edge extending along a second direction. The backlight module includes a first brightness enhancing film including first microstructures arranged along the first direction. The first microstructures that pass through the peripheral region without connecting to the first edge have less light gathering efficiency than the first microstructures that only pass through the light emitting region. The reel faces the light transmissive region, and the display panel and the reel are respectively located on opposing sides of the backlight module.

23 Claims, 11 Drawing Sheets

(56) References Cited

U.S. PATENT DOCUMENTS

| | | |
|---|---|---|
| 2008/0214277 A1 | 9/2008 | Kishi |
| 2010/0128187 A1 | 5/2010 | Brott et al. |
| 2012/0038837 A1* | 2/2012 | Chou .................. G07F 17/3211 349/1 |
| 2014/0133128 A1* | 5/2014 | Oh .......................... G09F 13/08 362/84 |
| 2014/0320783 A1* | 10/2014 | Han ..................... G02B 6/0053 349/64 |
| 2015/0316708 A1* | 11/2015 | Birman ................ G02B 6/0051 362/607 |

* cited by examiner

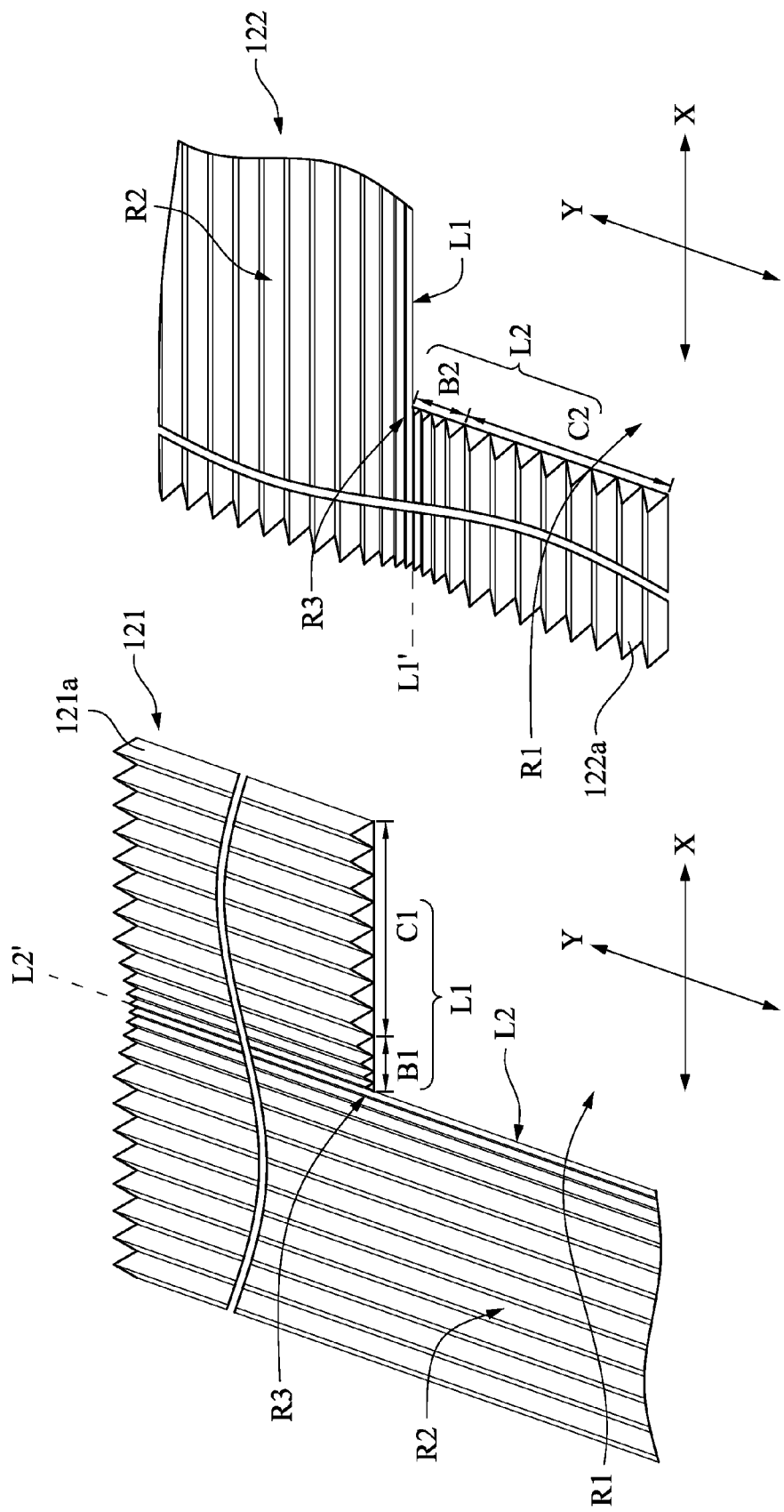

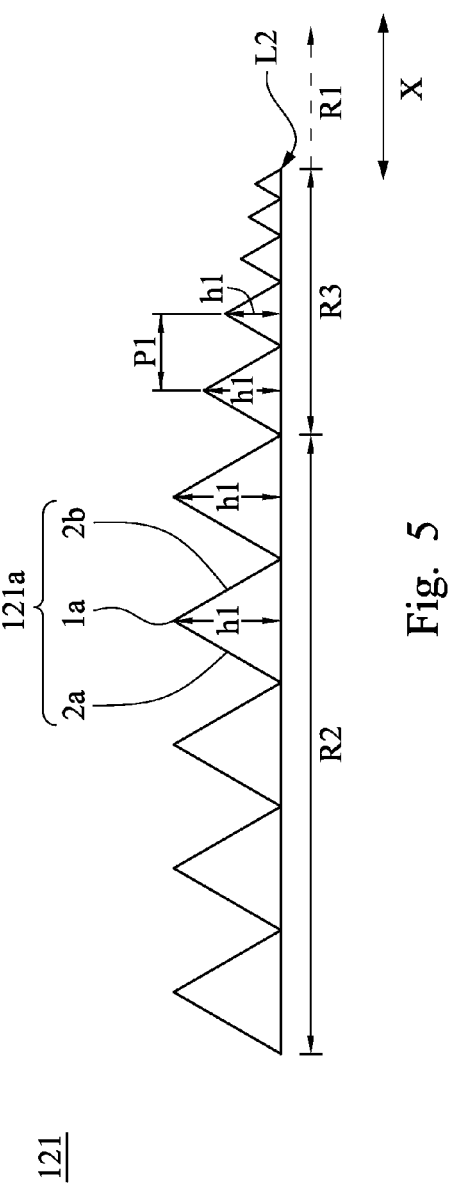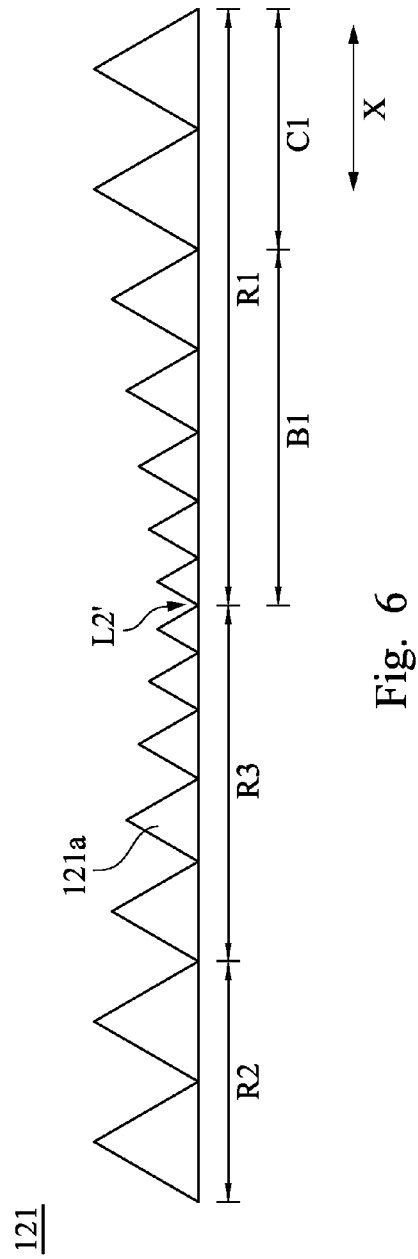

DISPLAY DEVICE

RELATED APPLICATIONS

This application claims priority to Taiwan Application Serial Number 103124931, filed Jul. 21, 2014, which is herein incorporated by reference.

BACKGROUND

1. Field of Invention

The present invention relates to a display device, and more particularly, to a display device having a brightness enhancing film.

2. Description of Related Art

Generally speaking, a currently available slot machine display device may include a physical reel disposed therein to produce a three-dimensional (3D) visual effect of continuous scrolling images in the screen. Through the rotation of the reel, when a user watches the display device, the scrolling images appear as a 3D object, instead of a two-dimensional (2D) object displayed in the screen.

In order to make the physical reel inside the display device visible, some areas of the backlight module corresponding to the location of the reel are configured to be transparent so that the user can see the physical reel through such areas. That is, when a user watches the display device, the rotating reel is visible in front of the user directly through the backlight module, display panel and various inner components of the display device. In order to allow a user to see the rotating reel, one approach is to form a hole in the backlight module at an area thereof corresponding to the position of the reel. However, after forming such a hole in the backlight module, a "gray zone" may appear at areas around the edges of the hole.

SUMMARY

For solving the problem described above, an embodiment of the present invention provides a display device. The display device includes a display panel, a backlight module and a reel. The backlight module is disposed facing the display panel. The backlight module includes a light transmissive region, a light emitting region and a peripheral region, in which the peripheral region is disposed between the light transmissive region and the light emitting region. The light transmissive region includes a first edge extending along a first direction and a second edge extending along a second direction different from the first direction, in which the first edge is connected with the second edge. The backlight module includes a first brightness enhancing film. The first brightness enhancing film includes a plurality of first microstructures. The plurality of the first microstructures are arranged along the first direction, in which the plurality of the first microstructures that pass through the peripheral region and are not connected with the first edge, have less light gathering efficiency than the plurality of the first microstructures that only pass through the light emitting region. The reel is disposed facing the light transmissive region, in which the display panel and the reel are respectively located on two opposing sides of the backlight module.

As a result, because a part of the brightness enhancing film of the backlight module has a structure with less light gathering efficiency, an obviously bright and dark contrast at a boundary portion of the light emitting region and the light transmissive region can be avoided, thereby solving the problem of "gray zone" in the related art.

BRIEF DESCRIPTION OF THE DRAWINGS

The invention can be more fully understood by reading the following detailed description of the embodiments, with reference made to the accompanying drawings as follows:

FIG. 4A and FIG. 4B are enlarged views respectively of a first brightness enhancing film and a second brightness enhancing film of FIG. 1.

FIG. 5 is a first specific aspect of a cross-sectional view of the first brightness enhancing film taken along line A-A' of FIG. 2.

FIG. 6 is a cross-sectional view of the first brightness enhancing film of FIG. 5 taken along line B-B' of FIG. 2.

DETAILED DESCRIPTION

Figure 1:
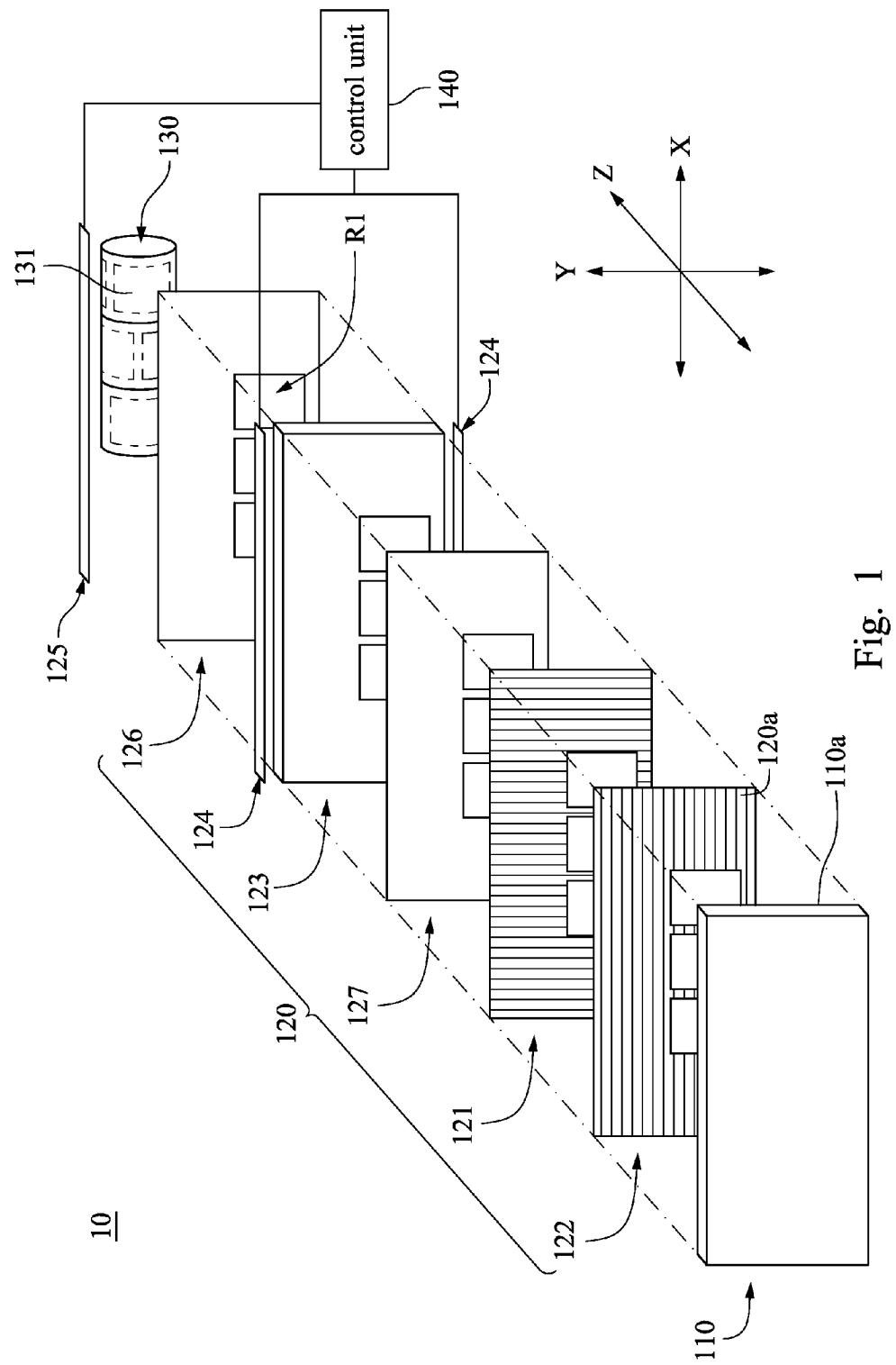
FIG. 1 is an exploded view of a display device in accordance with an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used herein, "around", "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

A display device disclosed in the following embodiments can be applied as a slot machine display device. More particularly, the display device of the following embodiments is capable of displaying continuous scrolling images. Furthermore, when the display device displays such continuous scrolling images, the scrolling images can be presented with a 3D visual effect having depth or distance. When the display device does not display continuous scrolling images, images in the display device are presented as 2D objects. However, the claimed scope of the present disclosure is not limited in this regard. The display device disclosed in the following embodiments can be any display device that needs to display images with a 3D visual effect sometimes and to switch to displaying images with a 2D visual effect whenever appropriate.

FIG. 1 is an exploded view of the display device in accordance with an embodiment of the present disclosure. With reference made to FIG. 1, the display device 10 of the present embodiment includes a display panel 110, a backlight module 120 and a reel 130, in which the display panel 110 and the reel 130 are respectively located on two opposing sides of the backlight module 120. In the present embodiment, the reel 130 has patterns 131 thereon. When the reel 130 rotates, the patterns 131 on the reel 130 appear as continuously scrolling images presented in front of a user through the backlight module 120, the display panel 110 and inner components of the display device 10. Since the reel is a physical object inside the display device 10, the patterns 131 on the reel 130 appear as a 3D object.

More specifically, in one embodiment, the backlight module 120 is disposed facing the display panel 110. In other words, one surface 120a of the backlight module 120 (for example, a front face of the backlight module 120) is disposed facing one surface 110a of the display panel 110. Furthermore, with reference made to FIG. 2, which is a perspective view of the backlight module 120 in FIG. 1 shown in an assembled state, the backlight module 120 includes a light transmissive region R1, a light emitting region R2 and a peripheral region R3. In the present embodiment, the light transmissive region R1 is an opening, and the opening can be a channel passing through the front and rear surface of the backlight module 120. Light travelling in any direction can pass through the channel without obstruction. Referring additionally to FIG. 1, the reel 130 is disposed facing the light transmissive region R1. Through the light transmissive region R1 and a transparent portion of the display panel 110 that corresponds in position to the reel 130, when the reel 130 rotates, the patterns 131 on the reel 130 can be presented in front of the user with a 3D visual effect.

The light emitting region R2 is a region where the light uniformly emits from the surface 120a of the backlight module 120. Generally speaking, the light emitting region R2 is a surface light source that emits light with uniform luminance and towards the display panel 110 so that the display panel 110 can display two-dimensional images.

The peripheral region R3 is disposed between the light transmissive region R1 and the light emitting region R2. The peripheral region R3 is a region on the surface 120a of the backlight module 120 that emits light having a weaker luminance than the light emitting region R2. In one embodiment, the size of the peripheral region R3 is close to the size of the "gray zone" found in the related art. In another embodiment, the peripheral region R3 is a region that extends along a direction from the light transmissive region R1 to the light emitting region R2 about 2 mm to about 10 mm. In yet another embodiment, the range of extension of the peripheral region R3 is at least equal to or greater than the "gray zone" of the related art.

In some embodiments, the peripheral region R3 emits light having less luminance than the "gray zone" of the related art. Specifically, in some embodiments of the present disclosure, a brightness enhancing film on the peripheral region R3 has less light gathering efficiency than a brightness enhancing film found on the "gray zone" of the related art. As a result, the user cannot easily perceive a bright and dark contrast on the boundary portion between the light transmissive region R1 and the light emitting region R2. That is, the existence of the peripheral region R3 can not be perceived by the user.

In yet another embodiment, the peripheral region R3 of the backlight module 120 emits light with gradually decreasing luminance from the light emitting region R2 toward the light transmissive region R1. As a result, the user does not perceive obviously a bright and dark contrast on the boundary portion of the light transmissive region R1 and the light emitting region R2.

Figure 2:
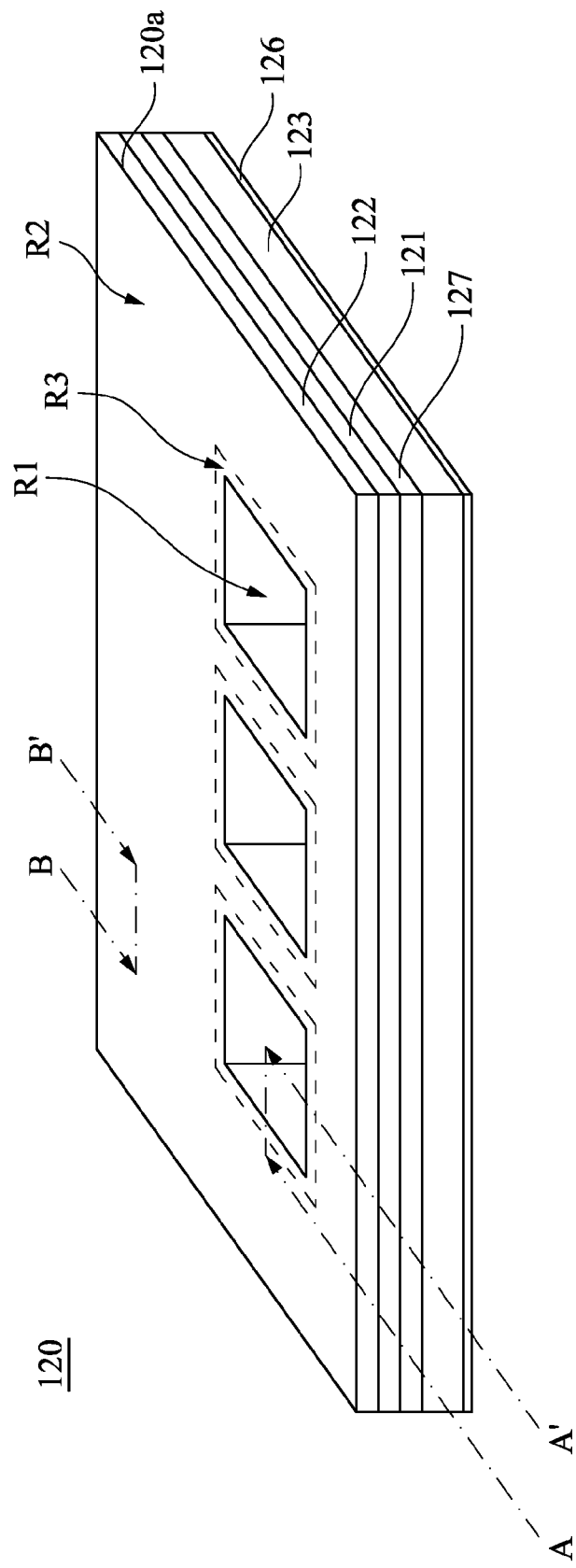
FIG. 2 is a perspective view of a backlight module in FIG. 1, in which the backlight module is shown in an assembled state.
Figure 3:
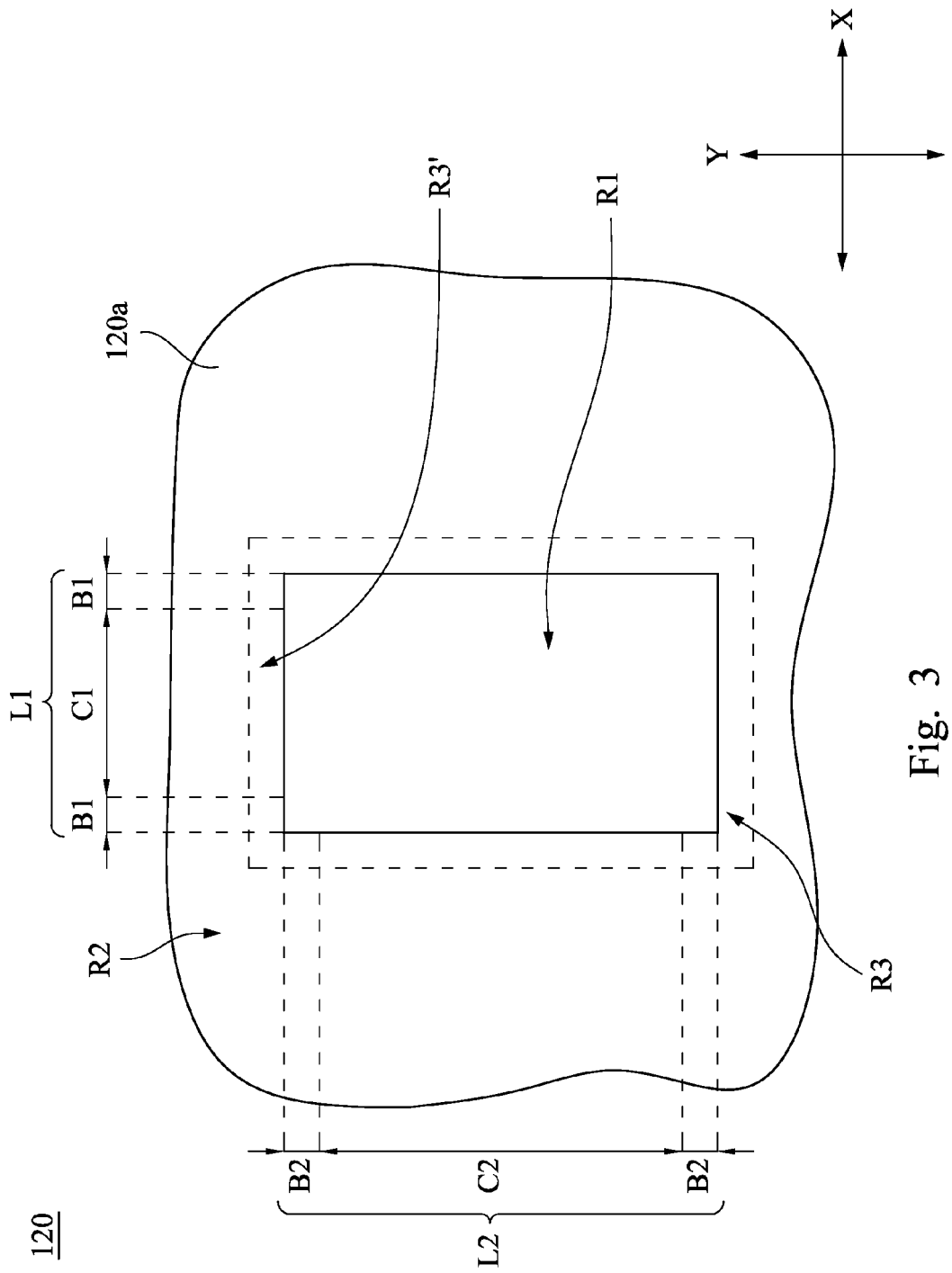
FIG. 3 is an enlarged fragmentary view of a front face of the backlight module in FIG. 2.

FIG. 3 is an enlarged fragmentary view of the front face of the backlight module 120 in FIG. 2. As illustrated in FIG. 3, the light transmissive region R1 includes a first edge L1 extending along a first direction X and a second edge L2 extending long a second direction Y, in which the first edge L1 is connected with the second edge L2 and the first direction X and the second direction Y are two different directions. In one embodiment, the first direction X and the second direction Y are substantially orthogonal to each other, but the present disclosure is not limited in this regard. In one embodiment, the peripheral region R3 can be a region that extends from borders of the first edge L1 and the second edge L2 about 2 mm to about 10 mm toward the light emitting region R2.

In the following embodiments, the components of the backlight module 120 are first described, after which the manner in which the backlight module 120 reduces or eliminates bright and dark contrast among borders of the light transmissive region R1, the peripheral region R3 and the light emitting region R1 will be explained.

With reference made to FIG. 1, in one embodiment, the backlight module 120 includes, for example, a first brightness enhancing film 121, a second brightness enhancing film 122, a light guide plate 123, two first light sources 124, a reflecting plate 126 and a diffuser plate 127. The first light sources 124 include multiple light emitting diodes, but the present disclosure is not limited to such a configuration. In the embodiment shown in FIG. 1, the backlight module 120 is an edge-illumination type backlight module. The two first light sources 124 are respectively located on two lateral sides, e.g., the upper lateral side and the lower lateral side, of the light guide plate 123, but the present disclosure is not limited to such a configuration. The quantity of the first light sources 124 is also not limited to two. The quantity of the first light sources 124 can be adjusted according to actual requirements.

The reflecting plate 126 is located between the reel 130 and the light guide plate 123 so that the light of the first light source 124 is emitted in the direction toward the display panel 110. The diffuser plate 127 is located between the first brightness enhancing film 121 and the light guide plate 123, so as to increase the uniformity of light emitted from the light emitting region R2 of the backlight module 120. The quantity and location of the diffuser plate 127 can be adjusted according to actual requirements. The first brightness enhancing film 121 is, for example, located between the light guide plate 123 and the display panel 110. More specifically, the first brightness enhancing film 121 is, for example, located between the second brightness enhancing film 122 and the diffuser plate 127, and the second brightness enhancing film 122, is, for example, located between the first brightness enhancing film 121 and the display panel 110. The first and second brightness enhancing films 121, 122 can enhance the luminance intensity of the backlight module 120. In summary, as shown in FIG. 1, the order of arrangement of the optical films of the backlight module 120 along a third direction Z is the second brightness enhancing film 122, the first brightness enhancing film 121, the diffuser plate 127, the light guide plate 123, and the reflecting plate 126, in which the third direction Z is substantially perpendicular to the first direction X and the second direction Y. However, the present disclosure is not limited to such a configuration. The order of arrangement of these elements can be adjusted according to actual requirements.

With continued reference made to FIG. 1, the display device 10 further includes a second light source 125, and the second light source 125 is located on a path extending from the reel 130 along the second direction Y. In other words, the second light source 125 is located above the reel 130, and is used to provide light to the reel 130, but the present disclosure is not limited in this regard. In other embodiments, there is an accommodating space inside the reel 130, and the second light source 125 can be disposed inside the accommodating space of the reel 130 so that light is emitted from the reel 130. It should be noted that the optical films or the order of arrangement of the optical elements of the display device 10 described above are not used to limit the present invention. For example, in another embodiment, the second light source 125 may be omitted from the configuration of the display device 10, and the display device 10 can guide light to illuminate the reel 130 through the light guiding structure near the light transmissive region R1 on the light guide plate 123 of the backlight module 120.

Next, reference is made to FIG. 1 to FIG. 4A and FIG. 4B, in which FIG. 4A and FIG. 4B are enlarged views respectively of the first brightness enhancing film 121 and the second brightness enhancing film 122 of FIG. 1. There are breaking lines in FIG. 4A and FIG. 4B for illustrating the prism structure of the first brightness enhancing film 121 and the second brightness enhancing film 122. As shown in FIG. 4A, the first brightness enhancing film 121 of the backlight module 120 includes a plurality of first microstructures 121a, and the first microstructures 121a are arranged along the first direction X. In other words, the first microstructures 121a repeatedly appear along the first direction X. Furthermore, the plurality of the first microstructures 121a that pass through the peripheral region R3 and are not connected with the first edge L1, have less light gathering efficiency than the plurality of the first microstructures 121a that only pass through the light emitting region R2, so as to reduce bright and dark contrast. In addition, in one embodiment, the light gathering efficiency of the plurality of the first microstructures 121a that pass through the peripheral region R3 (shown in FIG. 4A) gradually decreases along the first direction X from the outer edge of the peripheral region R3 to the second edge L2 of the light transmissive region R1. More specifically, with reference made to both FIG. 2 and FIG. 4A, the light gathering efficiency of the first microstructures 121a gradually decreases along the first direction X from the boundary between the peripheral region R3 and the light emitting region R2 to the boundary between the peripheral region R3 and the light transmissive region R1. As a result, the luminance intensity of the peripheral region R3 of the backlight module 120 gradually decreases from the light emitting region R2 to the light transmissive region R1 along the first direction X, so that comparing the peripheral region R3 with the adjacent light transmissive region R1 or the adjacent light emitting region R2, the obviously bright and dark contrast does not exist, thereby resulting in a better image quality.

With reference made to FIG. 2 to FIG. 4B, in one embodiment, the second brightness enhancing film 122 of the backlight module 120 is disposed opposing to the first brightness enhancing film 121. The second brightness enhancing film 122 includes a plurality of second microstructures 122a, and the second microstructures 122a are arranged along the second direction Y. In other words, the second microstructures 122a repeatedly appear along the second direction Y. Further, the plurality of the second microstructures 122a that pass through peripheral region R3 and are not connected with the second edge L2, have less light gathering efficiency than the plurality of the second microstructures 122a that only pass through the light emitting region R2, so as to reduce bright and dark contrast. In addition, in one embodiment, the light gathering efficiency of the plurality of the second microstructures 122a that pass through the peripheral region R3 gradually decreases along the second direction Y from the outer edge of the peripheral region R3 to the first edge L1 of the light transmissive region R1. More specifically, with reference made to both FIG. 2 and FIG. 4B, the light gathering efficiency of the second microstructures 122a gradually decreases along the second direction Y from the boundary between the peripheral region R3 and the light emitting region R2 to the boundary between the peripheral region R3 and the light transmissive region R1. As a result, the luminance intensity of the peripheral region R3 of the backlight module 120 gradually decreases from the light emitting region R2 to the light transmissive region R1 along the second direction Y, so as to eliminate the issue of bright and dark contrast among the light emitting region R2, the peripheral region R3 and the light transmissive region R1, thereby resulting in a better image quality. Furthermore, through the design of gradually decreasing the light gathering efficiency in the peripheral region R3 of the first brightness enhancing film 121 and the second brightness enhancing film 122, the luminance intensity on the boundary portion between the light emitting region R2 and the peripheral region R3 of the backlight module 120 becomes more uniform, thereby increasing the display quality of the display device 10.

It is noted that, with reference made to FIG. 4A and FIG. 4B, in one embodiment, the first edge L1 of the first brightness enhancing film 121 further includes a first central section C1 and a first side section B1, in which the first side section B1 is disposed between the first central section C1 and the second edge L2. Furthermore, the plurality of the first microstructures 121a that are connected with the first central section C1 have substantially the same light gathering efficiency as the plurality of the first microstructures 121a that only pass through the light emitting region R2.

In addition, the light gathering efficiency of the plurality of the first microstructures 121a that are connected with the first side section B1 gradually increases along the first direction X towards the first central section C1. More specifically, an imaginary line L2' can be drawn on the first brightness enhancing film 121 along the second edge L2 in the second direction Y. With reference to FIG. 4A, the first brightness enhancing film 121 has the weakest light gathering efficiency on the line L2', and the light gathering efficiency gradually increases towards both the right and left sides of the line L2'. The light gathering efficiency on the left side of the first microstructures 121a that only pass through the light emitting region R2 and the light gathering efficiency on the right side of the first microstructures 121a that are connected with the first central section C1 increase to substantially the same intensity. In summary, in one embodiment, the light gathering efficiency on two sides of the line L2' is advanced symmetrically and gradually from weak to strong. As a result, there is no obvious bright and dark contrast on the boundary portion between the light emitting region R2 and the light transmissive region R1.

Similarly, as illustrated in FIG. 4B, the second edge L2 of the second brightness enhancing film 122 further includes a second central section C2 and a second side section B2, in which the second side section B2 is disposed between the second central section C2 and the first edge L1. Furthermore, the plurality of the second microstructures 122a that are connected with second central section C2 have substantially the same light gathering efficiency as the plurality of the second microstructures 122a that only pass through light emitting region R2. In addition, the light gathering efficiency of the plurality of the second microstructures 122a that are connected with the second side section B2 gradually increases along the second direction Y towards the second central section C2. More specifically, an imaginary line L1' can be drawn on the second brightness enhancing film 122 along the first edge L1 in the first direction X, and the light gathering efficiency on the left side of the line L1' and the light gathering efficiency on the right side of the line L1' is advanced symmetrically from weak gradually to strong. As a result, there is no obvious bright and dark contrast on the boundary between the light emitting region R2 and the light transmissive region R1.

In one embodiment, the first side section B1 is extended about 2 mm to about 10 mm from the second edge L2 along a direction toward the first central section C1. Similarly, the second side section B2 is extended about 2 mm to about 10 mm from the first edge L1 along a direction toward the second central section C2. More specifically, the extending length of the first side section B1 along the first direction X and the extending length of the peripheral region R3 along the first direction X from the light transmissive region R1 to the light emitting region R2 are substantially the same. Similarly, the extending length of the second side section B2 along the second direction Y and the extending length of the peripheral region R3 along the second direction Y from the light transmissive region R1 to the light emitting region R2 are substantially the same. That is, along the first direction X, the structure in a range extending from the two sides of the line L2' about 2 mm to about 10 mm is symmetrical on the first brightness enhancing film 121. Similarly, along the second direction Y, the structure in a range extending from the two sides of the line L1' about 2 mm to about 10 mm is symmetrical on the second brightness enhancing film 122. Such a symmetrical structure allows for easy and quick manufacture of the first brightness enhancing film 121 and the second brightness enhancing film 122 that can eliminate bright and dark contrast between the light emitting region R2 and the light transmissive region R1.

After the first and second brightness enhancing films 121, 122 of the backlight module 120 as described in the above embodiments are stacked, since there is a design in which the light gathering efficiency changes from weak gradually to strong on left and right sides of the light transmissive region R1 of the first brightness enhancing film 121 outwardly along the first direction X and on upper and lower sides of the light transmissive region R1 of the second brightness enhancing film 122 outwardly along the second direction Y, there is no obvious bright and dark contrast on the boundary portion between the light emitting region R2 and the peripheral region R3 of the backlight module 120 so that the display device 10 has a good image quality. Furthermore, because the first microstructures 121a connected to the first side section B1 of the first brightness enhancing film 121 have a design in which the light gathering efficiency changes from weak gradually to strong inwardly along the first direction X, and the second microstructures 122a connected to the second side section B2 of the second brightness enhancing film 122 have a design in which the light gathering efficiency changes from weak gradually to strong inwardly along the second direction Y, the image quality of the display device 10 can be further improved.

A design of gradually changing light gathering efficiency is disclosed by the above embodiments, but the present invention is not limited in this regard. It is noted that, in some embodiments, if the light emitted from the peripheral region R3 has a lower luminance than the "gray zone" associated with the related art, there is also no obvious bright and dark contrast on the boundary portion between the light emitting region R2 and the light transmissive region R1.

Next, a plurality of exemplary embodiments are provided in the present disclosure for further disclosing a microstructure of a brightness enhancing film inside the peripheral region R3 with a changing light gathering efficiency. The structure disclosed in the following embodiments is just an example. Other structures should be included within the scope of the present invention if such structures allow for eliminating an obvious dark and brightness contrast between the light emitting region R2 and the peripheral region R3 or eliminating the "gray zone" associated with the related art in the peripheral region R3 through a gradually weakening light gathering efficiency from the light emitting region R2 to the light transmissive region R1 inside the peripheral region R3 or through making a luminance light gathering efficiency inside the peripheral region R3 lower than in a "gray zone" associated with the related art. Furthermore, although the first brightness enhancing film 121 is mainly introduced in the following drawings, it should be understood that the second brightness enhancing film 122 also has light gathering efficiency changing structure similar to the first brightness enhancing film 121. Only the second microstructures 122a of the second light enhancing film 122 are arranged along the second direction Y, and the first microstructures 121a of the first light enhancing film 121 are arranged along the first direction X.

FIG. 5 is a first specific aspect of a cross-sectional view of the first brightness enhancing film taken along line A-A' of FIG. 2. To simplify the explanation to follow, only the first brightness enhancing film 121 is illustrated, but the first and second brightness enhancing films 121 will be mentioned together. In the first brightness enhancing film 121 of FIG. 5, the reference number R1 denotes the light transmissive region, the position corresponding to the reference number R2 is an area where the corresponding microstructures only pass through the light emitting region R2, and the position corresponding to the reference number R3 is an area where the corresponding microstructures pass through the peripheral region R3 and are not connected with the first edge L1. As shown in FIG. 5, the plurality of the first microstructures 121a of the first brightness enhancing film 121 are prism columns. The plurality of the prism columns are arranged adjacent to each other. More specifically, the first microstructures 121a can be light-permeable triangular columns. Furthermore, the size of the plurality of the first microstructures 121a that pass through the peripheral region R3 gradually decreases along the first direction X from the outer edge of the peripheral region R3 to the second edge L2 of the light transmissive region R1.

In more detail, in one embodiment, each of the first microstructures 121a may have a crest line 1a, a first inclined face 2a and a second inclined face 2b, in which the crest line 1a is a line formed by intersection of the first inclined face 2a and the second inclined face 2b. The crest lines 1a of all the first microstructures 121a are arranged along the first direction X and parallel with each other. The height h1 of the crest lines 1a inside the peripheral region R3 gradually decreases from the light emitting region R2 toward the light transmissive region R1, and the height h1 of the crest lines 1a that are located inside the light emitting region R2 and do not pass through the peripheral region R3, are substantially the same. In summary, in FIG. 5, the cross section of the first microstructures 121a is triangular, and inside the peripheral region R3, the size of the triangle gradually decreases along the first direction X from the edge of the light emitting region R2 to the edge of the light transmissive region R1. Moreover, the triangular first microstructures 121a that only pass through the light emitting region R2 have substantially the same cross-sectional size.

Similarly, the plurality of the second microstructures 122a of the second brightness enhancing film 122 are prism columns. The size of the plurality of the second microstructures 122a that pass through the peripheral region R3 gradually decreases along the second direction Y from the outer edge of the peripheral region R3 to the first edge L1 of the light transmissive region R1. More specifically, the height of the first microstructures 121a between the second edge L2 and the light emitting region R2 along the first direction X is from about 5 um to about 30 um, and the pitch of the first microstructures 121a between the second edge L2 and the light emitting region R2 along the first direction X is from about 10 um to about 60 um. The height of the second microstructures 122a between the first edge L1 and the light emitting region R2 along the second direction Y is from about 5 um to about 30 um, and the pitch of the second microstructures 122a between the first edge L1 and the light emitting region R2 along the second direction Y is from about 10 um to about 60 um. That is, in FIG. 5, along the first direction X, the height h1 of the crest line 1a of the first microstructures 121a inside the peripheral region R3 becomes increasingly higher as the light emitting region R2 is approached. The height h1 of the crest line 1a of the first microstructures 121a is at most 30 um, and the pitch P1 between two adjacent crest lines 1a is at most 60 um. On the other hand, along the first direction X, the height h1 of the crest line 1a of the first microstructures 121a inside the peripheral region R3 becomes increasingly lower as the light transmissive region R1 is approached. The height h1 of the crest line 1a of the first microstructures 121a is at least 5 um, and the pitch P1 between two adjacent crest lines 1a is at least 10 um.

As a result, since the first microstructures 121a and the second microstructures 122a are designed having a prism column shape, and the size of the prism columns inside the peripheral region R3 gradually decreases along a direction from the light emitting region R2 to the light transmissive region R1, the light gathering efficiency of the first microstructures 121a gradually decreases along the first direction X from the outer edge of the peripheral region R3 to the second edge L2 of the light transmissive region R1, and the light gathering efficiency of the second microstructures 122a gradually decreases along the second direction Y from the outer edge of the peripheral region R3 to the first edge L1 of the light transmissive region R1.

FIG. 6 is a cross-sectional view of the first brightness enhancing film of FIG. 5 taken along line B-B' of FIG. 2. In the first brightness enhancing film 121 of FIG. 6, the position corresponding to the reference number B1 is an area where the corresponding microstructures are connected with the first side section B1 of the light transmissive region R1, the position corresponding to the reference number C1 is an area where the corresponding microstructures are connected with the first central section C1 of the light transmissive region R1, the position corresponding to the reference number R2 is an area where the corresponding microstructures only pass through the light emitting region R2, and the position corresponding to the reference number R3 is an area where the corresponding microstructures pass through the peripheral region R3 and are not connected with the first edge L1.

As shown in FIG. 4A and FIG. 6, the light gathering efficiency on two sides of the line L2' is symmetrically advanced from weak to strong. That is, the size of the prism columns on the first brightness enhancing film 121 changes gradually. Therefore, an obvious bright and dark contrast does not occur among the boundary portion of the light emitting region R2, the peripheral region R3 and the light transmissive region R1. The second brightness enhancing film 122 has a structure similar to the first brightness enhancing film 121, and so the related description of the second brightness enhancing film 122 is omitted herein.

Figure 7:
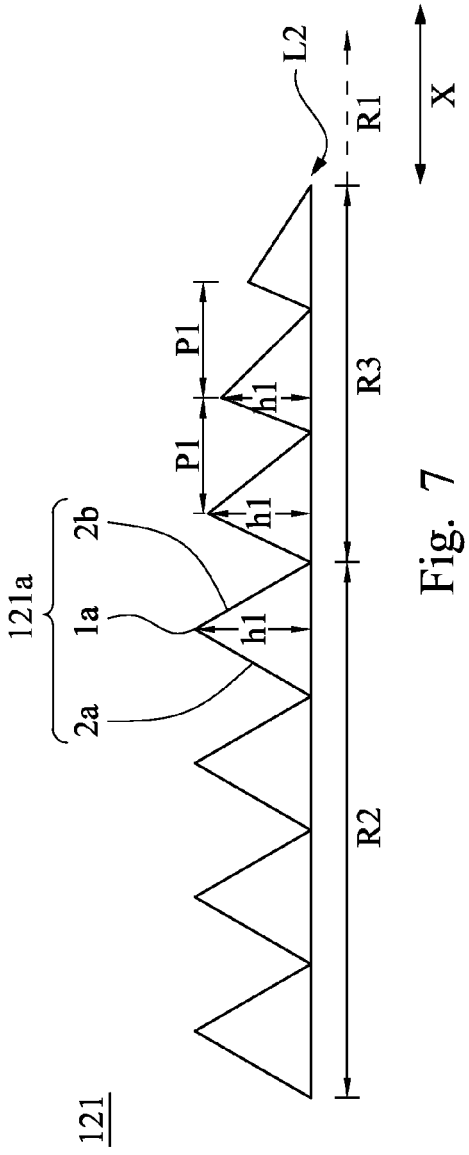
FIG. 7 is a second specific aspect of a cross-sectional view of the first brightness enhancing film taken along line A-A' of FIG. 2.

FIG. 7 is a second specific aspect of a cross-sectional view of the first brightness enhancing film taken along line A-A' of FIG. 2. As shown in FIG. 7, the plurality of the first microstructures 121a of the first brightness enhancing film 121 are prism columns. The plurality of the prism columns are configured adjacent to each other. In present embodiment, the size of the plurality of the first microstructures 121a that pass through the peripheral region R3 gradually decreases along the first direction X from the outer edge of the peripheral region R3 to the second edge L2 of the light transmissive region R1.

As shown in FIG. 7, as an example, the height h1 of the first microstructures 121a passing through the peripheral region R3 gradually decreases along the first direction X from the outer edge of the peripheral region R3 to the second edge L2 of the light transmissive region R1, and the first microstructures 121a that pass through the peripheral region R3 have a slope (the second inclined face 2b) close to the light transmissive region R1 with an inclination gradually decreasing along the first direction X from the outer edge of the peripheral region R3 to the second edge L2 of the light transmissive region R1. In more detail, the height h1 of the crest lines 1a of the first microstructures 121a that pass through the peripheral region R3 gradually decreases toward the second edge L2 of the light transmissive region R1. Furthermore, in the present embodiment, the pitch P1 of the first microstructures 121a that pass through the peripheral region R3 substantially remain unchanged, but the present invention is not limited in this regard. In addition, in the present embodiment, the inclination of the second inclined face 2b of the first microstructures 121a that pass through the peripheral region R3 is less than the inclination of the first inclined face 2a of the first microstructures 121a that pass through the peripheral region R3, and with the decreasing of the height h1 of the crest line 1a, the inclination of the second inclined face 2b gradually decreases from the outer edge of the peripheral region R3 to the second edge L2 of the light transmissive region R1. That is, the second inclined face 2b becomes more and more horizontal. In other words, the angle between the second inclined face 2b and the bottom face of the first microstructures 121a that pass through the peripheral region R3 is less than the angle between the first inclined face 2*a* and the bottom face of said first microstructures 121*a*, and with the decreasing of the height h1 of the crest line 1*a*, the angle between the second inclined face 2*b* and the bottom face gradually decreases from the outer edge of the peripheral region R3 to the second edge L2 of the light transmissive region R1.

In other words, the cross section of the first microstructures 121*a* that pass through the peripheral region R3 is in the shape of a non-isosceles triangle, in which the base angle near the light transmissive region R1 is from about 1 degree to about 45 degrees, and the base angle far from the light transmissive region R1 is less than 90 degrees and greater than the base angle near the light transmissive region R1. As a result, through the design of gradually decreasing of the height h1 of the first microstructures 121*a* that pass through the peripheral region R3 and gradually decreasing of the inclination of the second inclined face 2*b*, the light gathering efficiency of the first microstructures that pass through the peripheral region R3 gradually decreases from the light emitting region R2 toward the second edge L2 of the light transmissive region R1, thereby avoiding an obvious bright and dark contrast on the boundary portion between the light emitting region R2 and the light transmissive region R1 of the backlight module 120. The second brightness enhancing film 122 has a similar structure. That is, the height of the second microstructures 122*a* that pass through the peripheral region R3 gradually decreases along the second direction Y from the outer edge of the peripheral region R3 to the first edge L1 of the light transmissive region R1, and with respect to the second microstructures 122*a* that pass through the peripheral region R3, the inclination of the inclined face near the light transmissive region R1 gradually decreases along the second direction Y from the outer edge of the peripheral region R3 to the first edge L1 of the light transmissive region R1.

Figure 8:
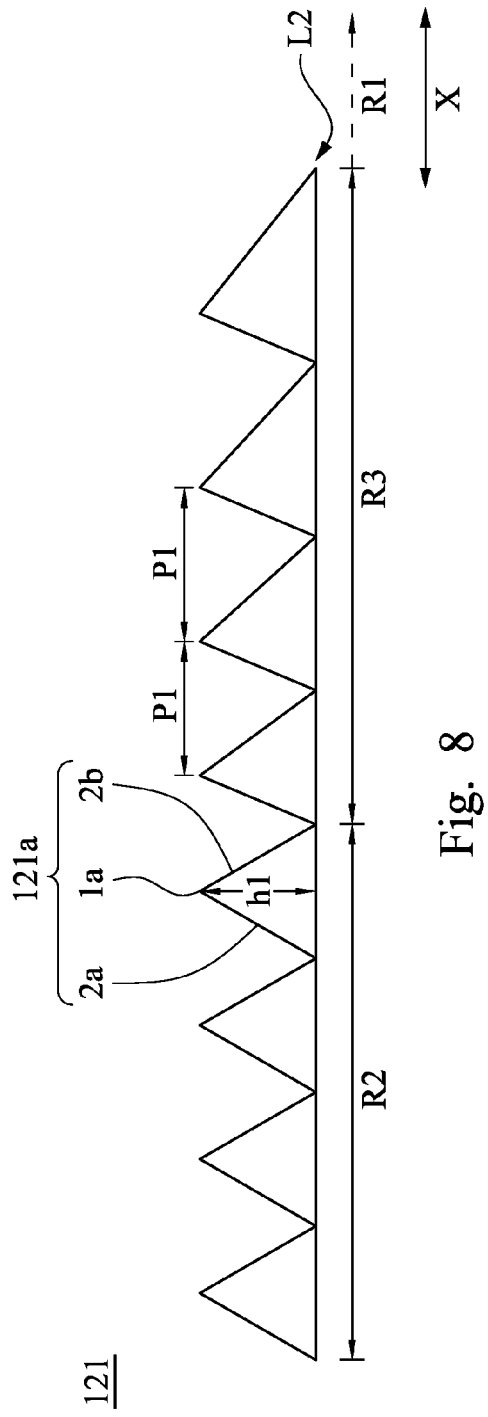
FIG. 8 is a third specific aspect of a cross-sectional view of the first brightness enhancing film taken along line A-A' of FIG. 2.

FIG. 8 is a third specific aspect of a cross-sectional view of the first brightness enhancing film taken along line A-A' of FIG. 2. As shown in FIG. 8, the plurality of the first microstructures 121*a* of the first brightness enhancing film 121 are respectively a plurality of prism columns. The plurality of the prism columns are arranged adjacent to each other. In the present embodiment, the height h1 of the first microstructures 121*a* that pass through the peripheral region R3 substantially remain unchanged, and the inclination of the inclined face near the light transmissive region R1 (the second inclined face 2*b*) gradually decreases along the first direction X1 from the outer edge of the peripheral region R3 to the second edge L2 of the light transmissive region R1. That is, the second inclined face 2*b* becomes more and more horizontal. As shown in FIG. 8, as an example, the crest lines 1*a* of the first microstructures 121*a* that pass through the peripheral region R3 have substantially the same height h1, and the crest lines 1*a* of the first microstructures 121*a* that only pass through the light emitting region R2 also have substantially the same height h1. Furthermore, the inclination of the second inclined face 2*b* of the first microstructures 121*a* that are near the light transmissive region R1 is less than the inclination of first inclined face 2*a* that are near the light emitting region R2, and the inclination of the second inclined face 2*b* gradually decreases from the outer edge of the peripheral region R3 to the second edge L2 of the light transmissive region R1. In the present embodiment, the pitch P1 between the first microstructures 121*a* that pass through the peripheral region R3 substantially remain unchanged, but the present invention is not limited in this regard. In some embodiments, the pitch P1 between the first microstructures 121*a* that pass through the peripheral region R3 may be adjusted according to actual requirements.

In other words, the cross section of the first microstructures 121*a* that pass through the peripheral region R3 is in the shape of a non-isosceles triangle, in which the base angle near the light transmissive region R1 is less than the base angle far from the light transmissive region R1, and the base angle near the light transmissive region R1 gradually decreases from the outer edge of the peripheral region R3 to the second edge L2 of the light transmissive region R1. More specifically, with such a non-isosceles triangle shape, the base angle near the light transmissive region R1 is from about 1 degree to about 45 degrees, and the base angle far from the light transmissive region R1 is less than 90 degrees and greater than the base angle near the light transmissive region R1. As a result, because the light gathering efficiency is lower with a smaller base angle in prism columns, in the embodiment of FIG. 8, the light gathering efficiency of the first microstructures 121*a* that pass through the peripheral region R3 gradually increases from the second edge L2 of the light transmissive region R1 to the light emitting region R2, thereby avoiding an obvious bright and dark contrast on the boundary portion among the peripheral region R3, the light emitting region R2 and the light transmissive region R1 of the backlight module 120. The second brightness enhancing film 122 has a structure similar to the first brightness enhancing film 121. That is, the second microstructures 122*a* that pass through the peripheral region R3 have substantially the same height, and the inclination of the inclined face near the light transmissive region R1 gradually decreases from the outer edge of the peripheral region R3 to the first edge L1 of the light transmissive region R1.

Figure 9:
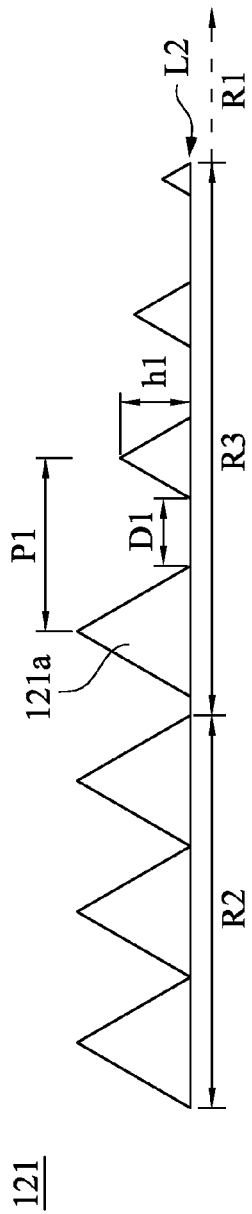
FIG. 9 is a fourth specific aspect of a cross-sectional view of the first brightness enhancing film taken along line A-A' of FIG. 2.

FIG. 9 is a fourth specific aspect of a cross-sectional view of the first brightness enhancing film taken along line A-A' of FIG. 2. As shown in FIG. 9, the plurality of the first microstructures 121*a* of the first brightness enhancing film 121 are prism columns, and the prism columns are at least partially separated from each other. Inside the peripheral region R3 and along the first direction X, the distance D1 between two adjacent microstructures 121*a* gradually increases along a direction from the light emitting region R2 (the outer edge of the peripheral region R3) to the second edge L2. More specifically, in one embodiment, the height h1 of the first microstructures 121*a* between the second edge L2 and the light emitting region R2 is from about 5 um to about 30 um, and the pitch P1 is greater than 10 um. Similarly, the prism columns of the second brightness enhancing film 122 can also be arranged separated from each other. Furthermore, along the second direction Y, the height of the second microstructures 122*a* between the first edge L1 and the light emitting region R2 (or the outer edge of the peripheral region R3) is configured from about 5 um to about 30 um, and the pitch is greater than 10 um.

In summary, comparing FIG. 9 with FIG. 5, the height h1 of the first microstructures 121*a* is in both cases from 5 um to 30 um. However, two adjacent first microstructures 121*a* in FIG. 9 are arranged separated from each other, so that inside the peripheral region R3, the pitch between two adjacent first microstructures 121*a* is greater than 10 um, thereby gradually decreasing the light gathering efficiency of the first microstructures 121*a* inside the peripheral region R3. Furthermore, variations in the light gathering efficiency of the first microstructures 121*a* inside the peripheral region R3 of FIG. 9 are greater than in the embodiment of FIG. 5.

Figure 10:
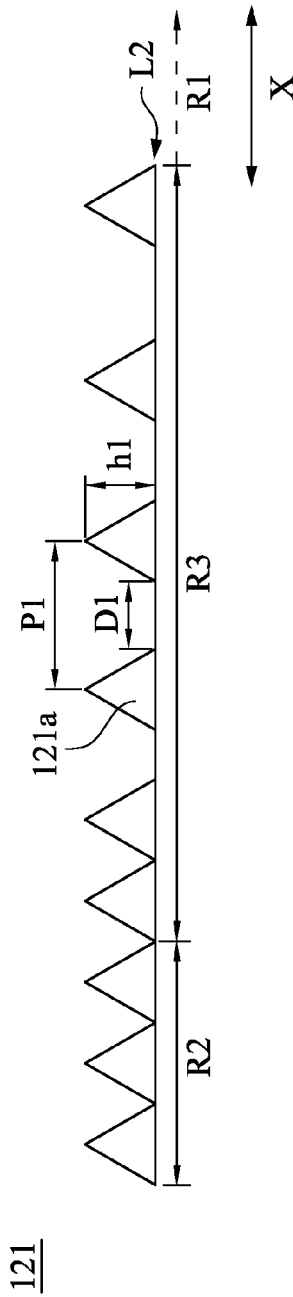
FIG. 10 is a fifth specific aspect of a cross-sectional view of the first brightness enhancing film taken along line A-A' of FIG. 2.

FIG. 10 is a fifth specific aspect of a cross-sectional view of the first brightness enhancing film taken along line A-A' of FIG. 2. As shown in FIG. 10, the plurality of the first microstructures 121a of the first brightness enhancing film 121 are prism columns. The arrangement density of the plurality of the first microstructures 121a that pass through the peripheral region R3 gradually decreases along the first direction X from the outer edge of the peripheral region R3 to the second edge L2 of the light transmissive region R1. In more detail, in FIG. 10, the cross-sectional size of the first microstructures 121a is substantially the same, and the distance D1 of two adjacent first microstructures 121a gradually increases from the light emitting region R2 to the second edge L2. In one embodiment, along the first direction X, the first microstructures 121a between the second edge L2 and the light emitting region R2 have a distance D1 between two adjacent prism columns greater than 10 um. More specifically, inside the peripheral region R3, the prism columns that are near the light emitting region R2 are arranged adjacent to each other with a pitch P1 of 10 um, and when extending along the first direction X toward the light transmissive region R1, the prism columns are arranged separated from each other, in which the distance D1 and pitch P1 between two adjacent prism columns become larger when approaching the light transmissive region R1.

Similarly, the plurality of the second microstructures 122a of the second brightness enhancing film 122 are also prism columns. The arrangement density of the plurality of the second microstructures 122a that pass through the peripheral region R3 gradually decreases along the second direction Y from the outer edge of the peripheral region R3 to the first edge L1 of the light transmissive region R1, and the second microstructures 122a between the first edge L1 and the light emitting region R2 have a distance between two adjacent prism columns, for example, greater than 10 um.

As a result, since the first microstructures 121a and the second microstructures 122a are designed having a prism column shape, and the arrangement density of the prism columns inside the peripheral region R3 gradually decreases along a direction from the light emitting region R2 to the light transmissive region R1, the light gathering efficiency of the first microstructures 121a gradually decreases along the first direction X from the outer edge of the peripheral region R3 to the second edge L2 of the light transmissive region R1, and the light gathering efficiency of the second microstructures 122a gradually decreases along the second direction Y from the outer edge of the peripheral region R3 to the first edge L1 of the light transmissive region R1. Although the first microstructures 121a of the first brightness enhancing film 121 that are connected with the first side section B1 are not illustrated in the above embodiments, the corresponding structure of the first microstructures 121a of the first brightness enhancing film 121 that are connected with the first side section B1 can be inferred since the light gathering efficiency of the first brightness film 121 advances symmetrically from line L2' toward two sides of the line L2'.

Figure 11:
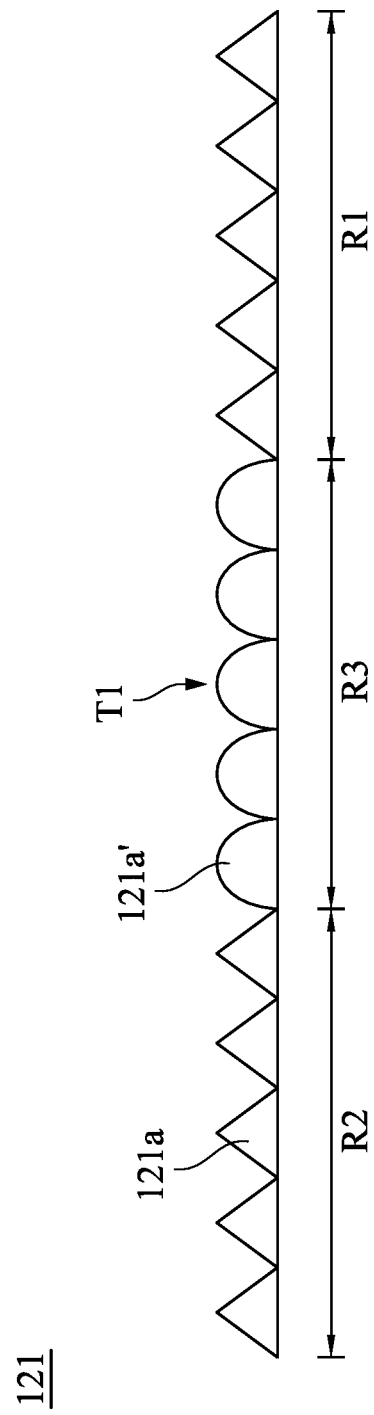
FIG. 11 is a sixth specific aspect of a cross-sectional view of the first brightness enhancing film taken along line A-A' of FIG. 2.

FIG. 11 is a sixth specific aspect of a cross-sectional view of the first brightness enhancing film taken along line B-B' of FIG. 2. As shown in FIG. 11, with respect to the first brightness enhancing film 121, the light gathering efficiency of the first microstructures 121a that pass through the peripheral region R3 and are not connected with first edge L1, is less than the light gathering efficiency of the first microstructures 121a that only pass through the light emitting region R2.

For example, the first microstructures 121a that only pass through the light emitting region R2 are prism columns, and each of the first microstructures 121a' that pass through the peripheral region R3 and are not connected with the first edge L1, has a first crest wave T1. The first crest wave T1 has a first circular angle. The light gathering efficiency of the first circular angle is less than the light gathering efficiency of the prism column.

In various aspects of embodiments, the radius of curvature of the first circular angle is from the 1 um to 25 um. For example, in an embodiment of the FIG. 11, the radius of curvature of the first circular angle is about 25 um, but the present is not limited in this regard. In this case, the first microstructures 121a' that pass through the peripheral region R3 and are not connected with the first edge L1 are, for example, approximately a semi-elliptical cylinder.

Furthermore, the configuration of the first microstructures 121a that are connected with the first central section C1 and the first side section B1 is also illustrated in FIG. 11. With reference made to FIG. 4A and FIG. 11, in an embodiment of FIG. 11, the light gathering efficiency of the first microstructures 121a that are connected with the first central section C1 of the first edge L1 and that are connected with the first side section B1 of the first edge L1 are substantially the same as the light gathering efficiency of the first microstructures 121a that only pass through the light emitting region R2. As a result, by substituting the prism column configuration with that of the first crest wave T1, the first microstructures 121a inside the peripheral region R3 are darker than the "gray zone" associated with the related art so that it is difficult for the user to perceive bright and dark contrast on the boundary portion between the light transmissive region R1 and the light emitting region R2.

Similarly, with respect to the second brightness enhancing film 122, the light gathering efficiency of the second microstructures 122a that pass through the peripheral region R3 and are not connected with second edge L2, is less than the light gathering efficiency of the second microstructures 122a that only pass through the light emitting region R2. For example, with respect to the second brightness enhancing film 122, the second microstructures 122a that only pass through the light emitting region R2 are prism columns, and each of the second microstructures 122a that pass through the peripheral region R3 and are not connected with the second edge L2, has a similar first crest wave T1. The first crest wave T1 has a first circular angle. Furthermore, after stacking the first brightness enhancing film 121 and the second brightness enhancing film 122 of the backlight module 120, there is no obvious bright and dark contrast on the boundary portion among the light emitting region R2, the peripheral region R3 and the light transmissive region R1 so that the display device 10 has a good image quality. In addition, in the embodiment of FIG. 11, it is necessary only that the first microstructures 121a of the first brightness enhancing film 121 and the second microstructures 122a of the second brightness enhancing film 122 be designed having a first circular angle inside the peripheral region R3 for the efficiency of reducing bright and dark contrast on the boundary portion between the light transmissive region R1 and the light emitting region R2 to be achieved. Compared with the structure of gradually changing the light gathering efficiency, the structure of the present embodiment is easier to manufacture.

Figure 12:
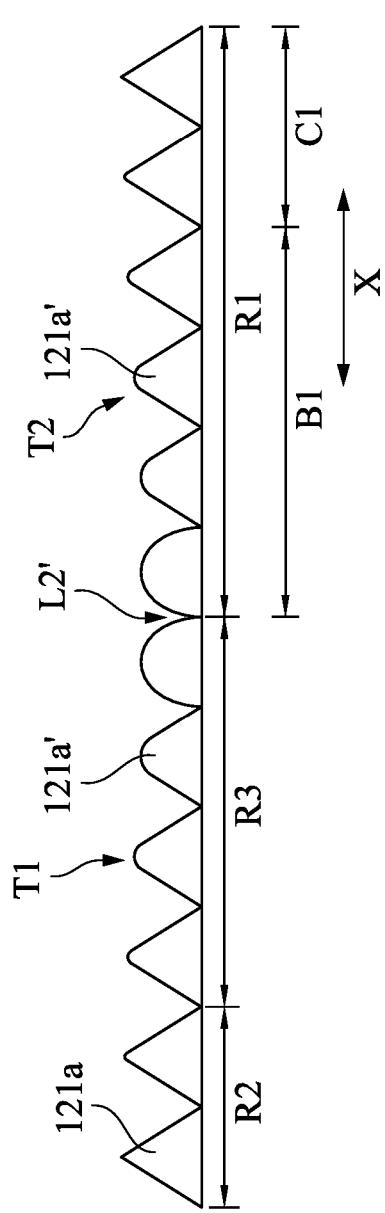
FIG. 12 is a seventh specific aspect of a cross-sectional view of the first brightness enhancing film taken along line A-A' of FIG. 2.

FIG. 12 is a seventh specific aspect of a cross-sectional view of the first brightness enhancing film taken along line B-B' of FIG. 2. As shown in FIG. 12, the radius of curvature of the first circular angle of the first microstructures 121a' that pass through the peripheral region R3 gradually increases along the first direction X from the outer edge of the peripheral region R3 to the second edge. That is, from the cross-sectional view of FIG. 12, the radius of curvature of the first circular angle of the first microstructures 121a' that pass through the peripheral region R3 gradually increases along a direction towards to the line L2'. In other words, the cross-sectional shape of the first microstructures 121a' near the light emitting region R2 is close to the cross-sectional shape of the first microstructures 121a that only pass through the light emitting region R2, in which the radius of curvature of the first circular angle is at least about 1 um. The radius of curvature of the first circular angle of the first microstructures 121a' near the light transmissive region R1 is greater than the radius of curvature of the first circular angle of the first microstructures 121a' near the light emitting region R2, in which the radius of curvature of the first circular angle is not more than 25 um.

Furthermore, the configuration of the first microstructure 121a that are connected with the first central section C1 and the first side section B1 is also illustrated in FIG. 12. In the embodiment of FIG. 12, the first microstructures 121a' connected with the first side section B1 have a plurality of second crest waves T2. Each of the second crest wave T2 has a second circular angle, in which the radius of curvature of the second circular angle of all of the first microstructures 121a' gradually decreases along the first direction X towards the first central section C1. Similarly, although the second brightness enhancing film 122 is not illustrated in FIG. 12, the second brightness film 122 also has similar structure. That is, the radius of curvature of the first circular angle of the second microstructures 122a gradually increases along the second direction Y from the outer edge of the peripheral region R3 to the line L1'. The second microstructures 122a' connected with the second side section B2 have a plurality of second crest waves T2. Each of the second crest wave T2 has a second circular angle, in which the radius of curvature of the second circular angle of all of the second microstructures 122a' gradually decreases along the second direction Y towards the second central section C2. As a result, with respect to the first brightness enhancing film 121 and the second brightness enhancing film 122, if the radius of curvature of the first circular angle or the radius of curvature of the second circular angle become larger, the light gathering efficiency is reduced. Therefore, on two sides of line L2' of the first brightness enhancing film 121 and on two sides of line L1' of the second brightness enhancing film 122, the light gathering efficiency advances symmetrically from weak to strong so that it is difficult for the user to perceive bright and dark contrast on the boundary portion between the light transmissive region R1 and the light emitting region R2.

Figure 13:
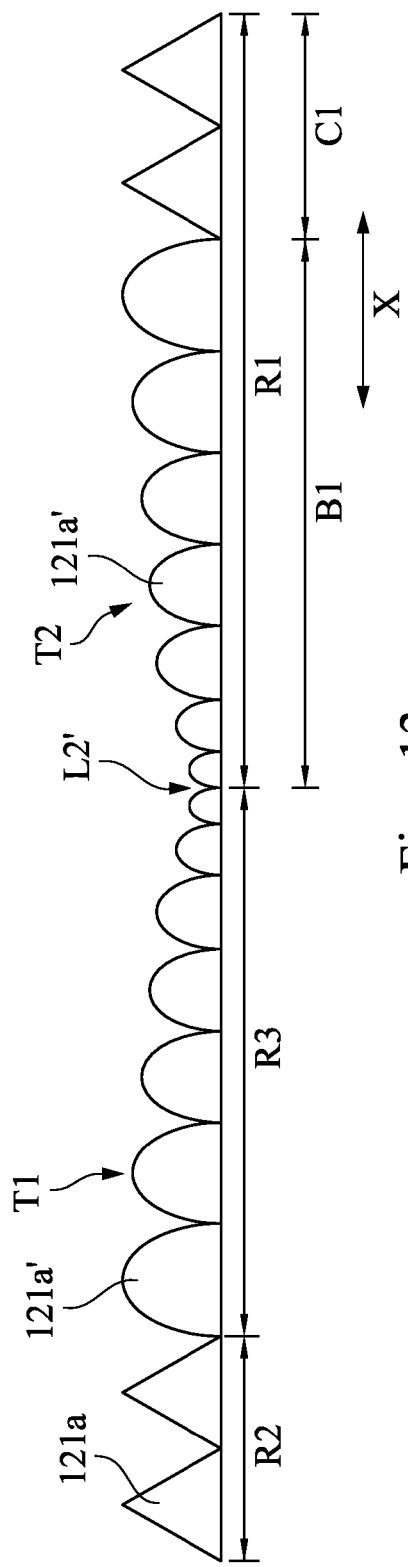
FIG. 13 is an eighth specific aspect of a cross-sectional view of the first brightness enhancing film taken along line A-A' of FIG. 2.

FIG. 13 is an eighth specific aspect of a cross-sectional view of the first brightness enhancing film taken along line B-B' of FIG. 2. As shown in FIG. 13, the first microstructures 121a' that pass through the peripheral region R3 have a first crest wave T1. The first crest wave T1 has a first circular angle. Furthermore, the first microstructures 121a' that pass through the peripheral region R3 are arranged adjacent to each other, and along a direction from the peripheral region R3 to the second edge L2. Also, the size of the first microstructures 121a' having the first circular angle gradually and proportionally decreases. That is, from the cross sectional view of FIG. 11, the size of the first microstructures 121a' that pass through the peripheral region R3 gradually decreases towards the line L2'.

With respect to the first brightness enhancing film 121, if the size of the first microstructures 121a' having the first circular angle become smaller, the light gathering efficiency becomes weaker. Therefore, the light gathering efficiency of the first microstructures 121a' of the first brightness enhancing film 121 that pass through the peripheral region R3 gradually decreases. The second brightness enhancing film 122 has a similar structure. That is, along a direction from the peripheral region R3 to the first edge L1 of the light transmissive region R1, the size of the second microstructures having the first circular angle gradually and proportionally decreases.

Furthermore, the configuration of the first microstructures 121a' that are connected with the first central section C1 and that are connected with the first side section B1 is also illustrated in FIG. 13. In the embodiment of FIG. 13, the first microstructures 121a' connected with the first side section B1 have a plurality of second crest waves T2. Each of the second crest waves T2 has a second circular angle. The size of the first microstructures 121a' having the second circular angle gradually and proportionally increases along the first direction X towards the first central section C1. Although the second brightness enhancing film 122 is not illustrated in FIG. 13, the second brightness enhancing film 122 also has a similar structure. A detailed description of the second brightness enhancing film 122 is omitted herein. As a result, the light gathering efficiency of the two sides of the line L2' on the first brightness enhancing film 121 and the two sides of the line L1' on the second brightness enhancing film 122 advances symmetrically from weak to strong. Thus, it is difficult for the user to perceive bright and dark contrast on the boundary portion among the light transmissive region R1, the light emitting region R2 and the peripheral region R3.

It should be noted that the structure associated with eliminating bright and dark contrast among the light transmissive region R1, the light emitting region R2 and the peripheral region R3 described in above embodiments is just an example. The display device 10 of the present invention is not limited in this regard. For example, the concept of arranging separately in the embodiments of FIG. 9 and FIG. 10 can be combined with the concept of circular angle in the embodiments of FIG. 12 and FIG. 13 so that the first microstructures 121a' shown in FIG. 12 and FIG. 13 may have first crest waves T1 and are arranged separated from each other.

Referring back to FIG. 1, in some examples, the display device 10 may further include a control unit 140. The control unit 140 may turn the first light source 124 on and turn the second light source 125 off in a first display mode, and may turn the first light source 124 and the second light source 125 on in a second display mode, in which the first display mode is not limited to the two-dimensional display mode mentioned in foregoing embodiments, and the second display mode is not limited to the three-dimensional display mode mentioned in foregoing embodiments. Furthermore, taking a slot machine display device as an example, if the first display mode is in the two-dimensional display mode mentioned in foregoing embodiments, the first display mode can display a point list or an animation when winning, and if the second display mode is in the three-dimensional display mode mentioned in foregoing embodiments, the second display mode can present the rotation of the reel. As a result, by using the control unit 140 to selectively turn on or turn off the second light source 125, the effect of a two-dimensional display mode or three-dimensional display mode can be achieved. In an actual implementation, the control unit 140 can be a logic circuit or a complex programmable logic device (CPLD), but it is not limited thereto.

Figure 14:
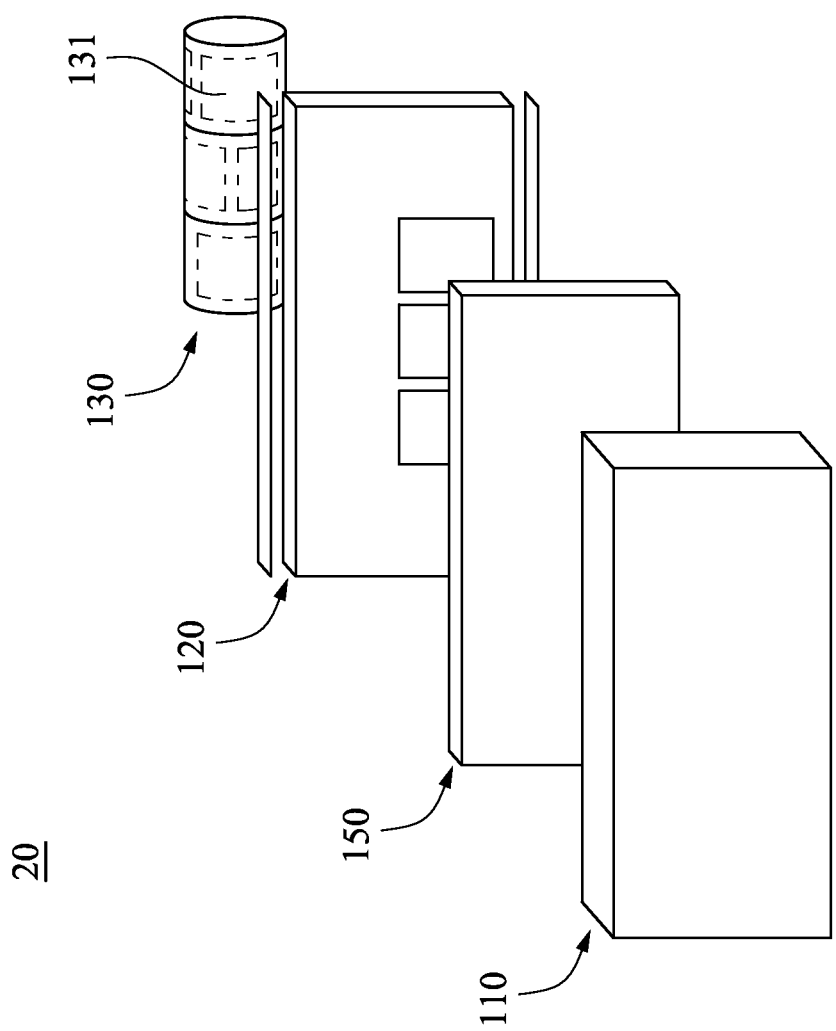
FIG. 14 is an exploded view of the display device in accordance with another embodiment of the present invention.

FIG. 14 is an exploded view of the display device 20 in accordance with another embodiment of the present invention. As illustrated in FIG. 14, the display device 20 may include a switch panel 150. The switch panel 150 is disposed between the display panel 110 and the reel 130. More specifically, the switch panel 150 is located between the backlight module 120 and the display panel 110. The switch panel 150 can switch into a diffracting state in the first display mode. For example, the switch panel 150 switches into the diffracting state when the reel 130 does not need to display or when in the two-dimensional display mode, so as to shield the reel 130. When the reel 130 needs to display in the display device 20, the switch panel 150 can become transparent. In one embodiment, the switch panel 150 may include polymer-dispersed liquid crystals (PDLC), but is not limited thereto.

Figure 15:
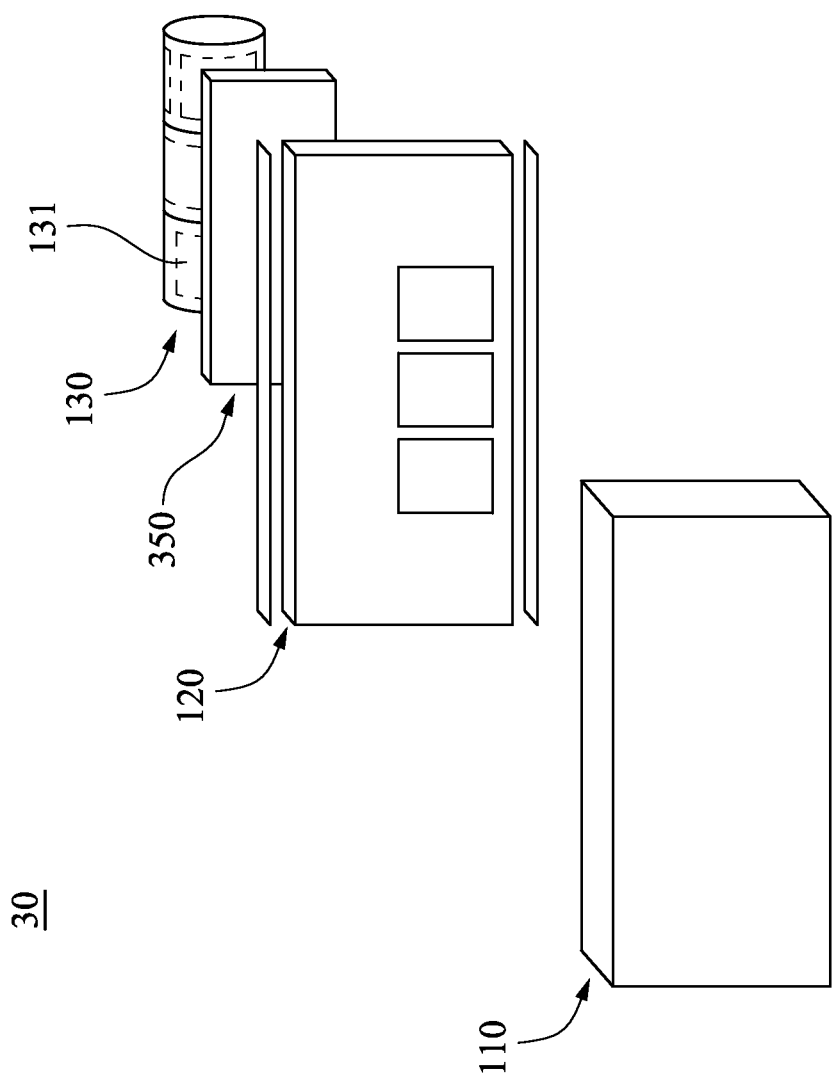
FIG. 15 is an exploded view of the display device in accordance with yet another embodiment of the present invention.

FIG. 15 is an exploded view of the display device 30 in accordance with yet another embodiment of the present invention. As illustrated in FIG. 15, the switch panel 350 of the display device 30 is disposed between the reel 130 and the light transmissive region R1 of the backlight module 120. That is, the switch panel 350 at least faces the light transmissive region R1. Furthermore, the size of the switch panel 350 is at least greater than the area of the light transmissive region R1. Therefore, the switch panel 350 of the present invention does not need to face the entire display panel 110, thereby reducing the cost of manufacturing the display device 30.

It is noted that all of the display devices 10, 20 and 30 are adapted to use the light gathering efficiency structure described above, for example, the first brightness enhancing film with the light gathering efficiency of the first microstructures that pass the peripheral region and are not connected with the first edge, is less than the light gathering efficiency of the first microstructures that only pass through the light emitting region, so as to prevent the formation of a gray zone. Furthermore, if the light gathering efficiency gradually changes, the image quality of the display device can be further improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:
    a display panel;
    a backlight module disposed facing the display panel, the backlight module comprising a light transmissive region, a light emitting region and a peripheral region, the peripheral region being disposed between the light transmissive region and the light emitting region, the light transmissive region comprising a first edge extending along a first direction and a second edge extending along a second direction different from the first direction, the first edge being connected with the second edge, the backlight module comprising a first brightness enhancing film, the first brightness enhancing film comprising a plurality of first microstructures, a plurality of the first microstructures being arranged along the first direction, wherein a plurality of the first microstructures that pass through the peripheral region and are not connected with the first edge, have less light gathering efficiency than a plurality of the first microstructures that only pass through the light emitting region; and
    a reel disposed facing the light transmissive region, wherein the display panel and the reel are respectively located on two opposing sides of the backlight module.

2. The display device of claim 1, wherein the first edge comprises a first central section and a first side section, the first side section is disposed between the first central section and the second edge, and a plurality of the first microstructures that are connected with the first central section have substantially the same light gathering efficiency as the plurality of the first microstructures that only pass through the light emitting region.

3. The display device of claim 2, wherein the light gathering efficiency of the plurality of the first microstructures that pass through the peripheral region gradually decreases along the first direction from an outer edge of the peripheral region to the second edge of the light transmissive region.

4. The display device of claim 3, wherein the light gathering efficiency of a plurality of the first microstructures that are connected with the first side section gradually increases along the first direction towards the first central section.

5. The display device of claim 1, wherein the backlight module further comprises a second brightness enhancing film, the second brightness enhancing film is disposed facing the first brightness enhancing film and comprises a plurality of second microstructures, a plurality of the second microstructures are arranged along the second direction, and a plurality of the second microstructures that pass through the peripheral region and are not connected with the second edge have less light gathering efficiency than a plurality of the second microstructures that only pass thorough the light emitting region.

6. The display device of claim 5, wherein the second edge comprises a second central section and a second side section, the second side section is disposed between the second central section and the first edge, and a plurality of the second microstructures that are connected with the second central section have substantially the same light gathering efficiency as the plurality of the second microstructures that only pass through the light emitting region.

7. The display device of claim 6, wherein the light gathering efficiency of the plurality of the second microstructures that pass through the peripheral region gradually decreases along the second direction from an outer edge of the peripheral region to the first edge of the light transmissive region.

8. The display device of claim 7, wherein the light gathering efficiency of a plurality of the second microstructures that are connected with the second side section gradually increases along the second direction towards the second central section.

9. The display device of claim 5, wherein the first microstructures and the second microstructures are a plurality of prism columns, the size of the plurality of the first microstructures that pass through the peripheral region decreases along the first direction from an outer edge of the peripheral region to the second edge of the light transmissive region, and the size of the plurality of the second microstructures that pass through the peripheral region decreases along the second direction from an outer edge of the peripheral region to the first edge of the light transmissive region.

10. The display device of claim 9, wherein the height of the plurality of the first microstructures that pass through the peripheral region gradually decreases along the first direction from an outer edge of the peripheral region to the second edge of the light transmissive region, the plurality of the first microstructures that pass through the peripheral region have a slope close to the light transmissive region with an inclination gradually decreasing along the first direction from an outer edge of the peripheral region to the second edge of the light transmissive region, the height of the plurality of the second microstructures that pass through the peripheral region gradually decreases along the second direction from an outer edge of the peripheral region to the first edge of the light transmissive region, and the plurality of the second microstructures that pass through the peripheral region have slopes close to the light transmissive region with an inclination gradually decreasing along the second direction from an outer edge of the peripheral region to the first edge of the light transmissive region.

11. The display device of claim 5, wherein the first microstructures and the second microstructures are a plurality of prism columns, the plurality of the first microstructures that pass through the peripheral region have substantially the same height, the plurality of the first microstructures that pass through the peripheral region have slopes close to the light transmissive region with an inclination gradually decreasing along the first direction from an outer edge of the peripheral region to the second edge of the light transmissive region, the plurality of the second microstructures that pass through the peripheral region have substantially the same height, and the plurality of the second microstructures that pass through the peripheral region have slopes close to the light transmissive region with an inclination gradually decreasing along the second direction from an outer edge of the peripheral region to the first edge of the light transmissive region.

12. The display device of claim 5, wherein the first microstructures and the second microstructures are a plurality of prism columns, the arrangement density of the plurality of the first microstructures that pass through the peripheral region gradually decreases along the first direction from an outer edge of the peripheral region to the second edge of the light transmissive region, and the arrangement density of the plurality of the second microstructures that pass through the peripheral region gradually decreases along the second direction from an outer edge of the peripheral region to the first edge of the light transmissive region.

13. The display device of claim 5, wherein the plurality of the first microstructures that only pass through the light emitting region and the plurality of the second microstructures that only pass through the light emitting region are a plurality of prism columns, the plurality of the first microstructures that pass through the peripheral region and are not connected with the first edge and the plurality of the second microstructures that pass through the peripheral region and are not connected with the second edge have a plurality of first crest waves, and a plurality of the first crest waves have a first circular angle.

14. The display device of claim 13, wherein the radius of curvature of the first circular angle of the first microstructures gradually increases along the first direction from an outer edge of the peripheral region to the second edge, and the radius of curvature of the first circular angle of the second microstructures gradually increases along the second direction from an outer edge of the peripheral region to the first edge.

15. The display device of claim 14, wherein the first edge comprises a first central section and a first side section, the first side section is disposed between the first central section and the second edge, the second edge comprises a second central section and a second side section, the second side section is disposed between the second central section and the first edge, a plurality of the first microstructures that are connected with the first side section and a plurality of the second microstructures that are connected with the second side section have a plurality of second crest waves, a plurality of the second crest waves have a second circular angle, the radius of curvature of the second circular angle of the first microstructures gradually decreases along the first direction towards the first central section, and the radius of curvature of the second circular angle of the second microstructures gradually decreases along the second direction towards the second central section.

16. The display device of claim 13, wherein the size of the first microstructures having the first circular angle gradually and proportionally decreases along the first direction from an outer edge of the peripheral region to the second edge of the light transmissive region, and the size of the second microstructures having the first circular angle gradually and proportionally decreases along the second direction from an outer edge of the peripheral region to the first edge of the light transmissive region.

17. The display device of claim 16, wherein the first edge comprises a first central section and a first side section, the first side section is disposed between the first central section and the second edge, the second edge comprises a second central section and a second side section, the second side section is disposed between the second central section and the first edge, a plurality of the first microstructures that are connected with the first side section and a plurality of the second microstructures that are connected with the second side section have a plurality of second crest waves, a plurality of the second crest waves have a second circular angle, the size of the first microstructures that have the second circular angle gradually and proportionally increases along the first direction towards the first central section, and the size of the second microstructures that have the second circular angle gradually and proportionally increases along the second direction towards the second central section.

18. The display device of claim 1, wherein the light transmissive region is an opening.

19. The display device of claim 1, wherein the backlight module further comprises a first light source and a light guide plate, the first light source is disposed on a side face of the light guide plate, and the first brightness enhancing film is disposed between the light guide plate and the display panel.

20. The display device of claim 19, wherein the backlight module further comprises a second light source configured to provide light to the reel.

21. The display device of claim 20, further comprising a control unit, wherein the control unit turns the first light source on and turns the second light source off in a first display mode, and the control unit turns the first light source and the second light source on in a second display mode.

22. The display device of claim 21, further comprising a switch panel disposed between the display panel and the reel, wherein the switch panel switches into a diffracting state in the first display mode to shield the reel.

23. The display device of claim 22, wherein the switch panel is disposed between the light transmissive region of the backlight module and the reel, and the size of the switch panel is at least greater than the area of the light transmissive region.

* * * * *